United States Patent
Takeda et al.

(10) Patent No.: US 7,642,485 B2
(45) Date of Patent: Jan. 5, 2010

(54) LASER BEAM PROCESSING MACHINE

(75) Inventors: Noboru Takeda, Tokyo (JP); Hiroshi Morikazu, Tokyo (JP); Satoshi Genda, Tokyo (JP); Yukio Morishige, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 11/338,761

(22) Filed: Jan. 25, 2006

(65) Prior Publication Data

US 2006/0163224 A1 Jul. 27, 2006

(30) Foreign Application Priority Data

Jan. 26, 2005 (JP) .............................. 2005-017815
Jan. 27, 2005 (JP) .............................. 2005-019915

(51) Int. Cl.
*B23K 26/02* (2006.01)

(52) U.S. Cl. .................. 219/121.82; 219/121.85; 219/121.6

(58) Field of Classification Search ............. 219/121.82, 219/121.85, 121.6
See application file for complete search history.

(56) References Cited

U.S. PATENT DOCUMENTS

| | | | | |
|---|---|---|---|---|
| 5,922,126 A | * | 7/1999 | Furukawa et al. | 117/54 |
| 6,550,277 B1 | * | 4/2003 | Uebbing et al. | 65/17.4 |
| 6,827,636 B2 | * | 12/2004 | Yamada | 451/65 |
| 6,998,571 B2 | * | 2/2006 | Sekiya et al. | 219/121.67 |
| 2003/0235937 A1 | * | 12/2003 | Mong et al. | 438/106 |
| 2004/0026382 A1 | * | 2/2004 | Richerzhagen | 219/121.6 |
| 2004/0164061 A1 | | 8/2004 | Takeuchi et al. | |
| 2005/0045090 A1 | * | 3/2005 | Ikegami et al. | 117/8 |

FOREIGN PATENT DOCUMENTS

| | | |
|---|---|---|
| JP | 6-169008 | 6/1994 |
| JP | 10-305420 | 11/1998 |
| JP | 2000/225485 | 8/2000 |
| JP | 2003-320466 | 11/2003 |
| WO | WO 2004/066369 | 8/2004 |

OTHER PUBLICATIONS

IBM Technical Disclosure Bulletin, Aug. 1989. v. 32, No. 3A, pp. 407-409. (NA8908407).*

* cited by examiner

*Primary Examiner*—M. Alexandra Elve
(74) *Attorney, Agent, or Firm*—Smith, Gambrell & Russell, LLP

(57) ABSTRACT

A laser beam processing machine comprising a chuck table for holding a workpiece, a laser beam application means for applying a laser beam to the workpiece held on the chuck table, and a processing-feed means for moving the chuck table and the laser beam application means relative to each other, wherein the chuck table comprises a body and a workpiece holding member disposed on the top surface of the body, and the workpiece holding member is made of a material which transmits a laser beam having a predetermined wavelength.

1 Claim, 8 Drawing Sheets

LASER BEAM PROCESSING MACHINE

FIELD OF THE INVENTION

The present invention relates to a laser beam processing machine for laser processing a workpiece such as a semiconductor wafer or the like.

DESCRIPTION OF THE PRIOR ART

In the production process of a semiconductor device, a plurality of areas are sectioned by dividing lines called "streets" arranged in a lattice pattern on the front surface of a substantially disk-like semiconductor wafer, and a circuit such as IC or LSI is formed in each of the sectioned areas. Individual semiconductor chips are manufactured by cutting this semiconductor wafer along the dividing lines to divide it into the areas each having a circuit formed thereon. An optical device wafer comprising a gallium nitride-based compound semiconductor laminated on the front surface of a sapphire substrate is also cut along dividing lines to be divided into individual optical devices such as light emitting diodes or laser diodes, which are widely used in electric appliances.

Cutting along the dividing lines of the above semiconductor wafer or optical device wafer is generally carried out by using a cutting machine called "dicer". This cutting machine comprises a chuck table for holding a workpiece such as a semiconductor wafer or optical device wafer, a cutting means for cutting the workpiece held on the chuck table, and a cutting-feed means for moving the chuck table and the cutting means relative to each other. The cutting means comprises a spindle unit comprising a rotary spindle, a cutting blade mounted on the spindle and a drive mechanism for rotary-driving the rotary spindle. The cutting blade is composed of a disk-like base and an annular cutting edge that is mounted on the side wall peripheral portion of the base and formed by fixing diamond abrasive grains having a diameter of about 3 μm to the base by electroforming.

Since a sapphire substrate, silicon carbide substrate, etc. have high Mohs hardness, however, cutting with the above cutting blade is not always easy. Further, as the cutting blade has a thickness of about 30 to 50 μm, the dividing lines for sectioning devices must have a width of about 100 μm. Therefore, a problem arises that the area ratio of the dividing lines to the wafer becomes large and hence, the effective area for forming devices becomes small. Since cutting with the cutting blade is carried out while water for cutting is supplied, another problem is also caused that waste fluid containing cutting chippings adheres to the surface of the wafer to contaminate it.

As a means of dividing a silicon wafer, gallium arsenide wafer, alumina ceramic wafer, etc. into individual chips, JP-A 10-305420 discloses a technology for dividing a wafer by applying a pulse laser beam having absorptivity for the wafer of, for example, a wavelength of 355 nm, along dividing lines formed on the wafer to form a groove along the dividing lines.

To improve the throughput of a circuit such as IC or LSI, a semiconductor wafer comprising a low dielectric constant film (low-k film) made of an inorganic material such as SiOF or BSG (SiOB) or an organic material such as a polyimide-based, parylene-based or the like polymer laminated on the front surface of a semiconductor substrate such as a silicon substrate has recently been implemented. Since the low-k film consists of multiple layers (5 to 15 layers) and is extremely fragile like mica, it involves a problem that when the above semiconductor wafer is cut along the dividing lines with the cutting blade, the low-k film peels off and this peeling reaches the circuits and deals a fatal blow to the semiconductor chips.

To solve the above problems, a processing machine for removing the low-k film by applying a pulse laser beam to the low-k film formed on the dividing lines of the semiconductor wafer and cutting the semiconductor wafer along the dividing lines from which the low-k film has been removed is disclosed by JP-A 2003-320466.

When the wafer is to be divided into individual chips as described above, a dicing tape made of polyolefin and the like is put on the back surface of the wafer so as to facilitate handling the wafer divided into individual chips. The wafer having the dicing tape thus put thereon is held on the chuck table of the laser beam processing machine in such a manner that the dicing tape side faces down, and a laser beam is applied from the front surface side (top surface side) formed on the wafer to form a groove along the dividing lines of the wafer. When the groove formed in the wafer reaches the back surface (undersurface) of the wafer, the laser beam passes through the dicing tape and reaches the holding member of the chuck table. Since the holding member of the chuck table is made of a porous ceramic or metal material, however, there is a problem that it absorbs the laser beam and generates heat, thereby melting the dicing tape and damaging it, when the laser beam reaches the top surface of the holding member. Further, such problems are caused that part of the molten dicing tape adheres to the holding member of the chuck table to contaminate the chuck table or the wafer can not be carried out from the chuck table.

To remove the Low-k film by applying a laser beam to the Low-k film formed on the dividing lines of the semiconductor wafer as described above, the chuck table is moved in the processing-feed direction while a laser beam is applied to the semiconductor wafer in a state where it is held on the chuck table. If the laser beam is applied across the periphery of the semiconductor wafer, however, it passes through the dicing tape put on the back surface of the semiconductor wafer and reaches the holding member of the chuck table, thereby causing the above problems.

SUMMARY OF THE INVENTION

It is an object of the present invention to provide a laser beam processing machine comprising a chuck table that can suppress the generation of heat even when a laser beam is applied to the chuck table.

To attain the above object, according to the present invention, there is provided a laser beam processing machine comprising a chuck table for holding a workpiece, a laser beam application means for applying a laser beam to the workpiece held on the chuck table, and a processing-feed means for moving the chuck table and the laser beam application means relative to each other, wherein the chuck table comprises a body and a workpiece holding member disposed on the top surface of the body, and the workpiece holding member is made of a material which transmits a laser beam having a predetermined wavelength.

The above chuck table is an electrostatic chuck having an electrode between the body and the workpiece holding member.

The wavelength of the laser beam applied by the above laser beam application means is in a range from 200 to 1,300 nm, and the above workpiece holding member is formed of quartz glass. The workpiece holding member is made of a foamed quartz glass porous material. The workpiece holding member is a quartz glass plate. The quartz glass plate has a plurality of suction holes communicating between the top surface and the undersurface. At least one of the top surface and undersurface of the workpiece holding member is roughened.

In the laser beam processing machine of the present invention, since the holding member of the chuck table is made of a material that transmits a laser beam having a predetermined wavelength, the laser beam is not absorbed by the surface of the holding member even when it passes through the dicing tape put on the workpiece and reaches the holding member. Accordingly, the generation of heat from the holding member is suppressed and hence, the dicing tape is not molten.

DETAILED DESCRIPTION OF THE PREFERRED EMBODIMENTS

Preferred embodiments of a laser beam processing machine constituted according to the present invention will be described in detail hereinunder with reference to the accompanying drawings.

Figure 1:
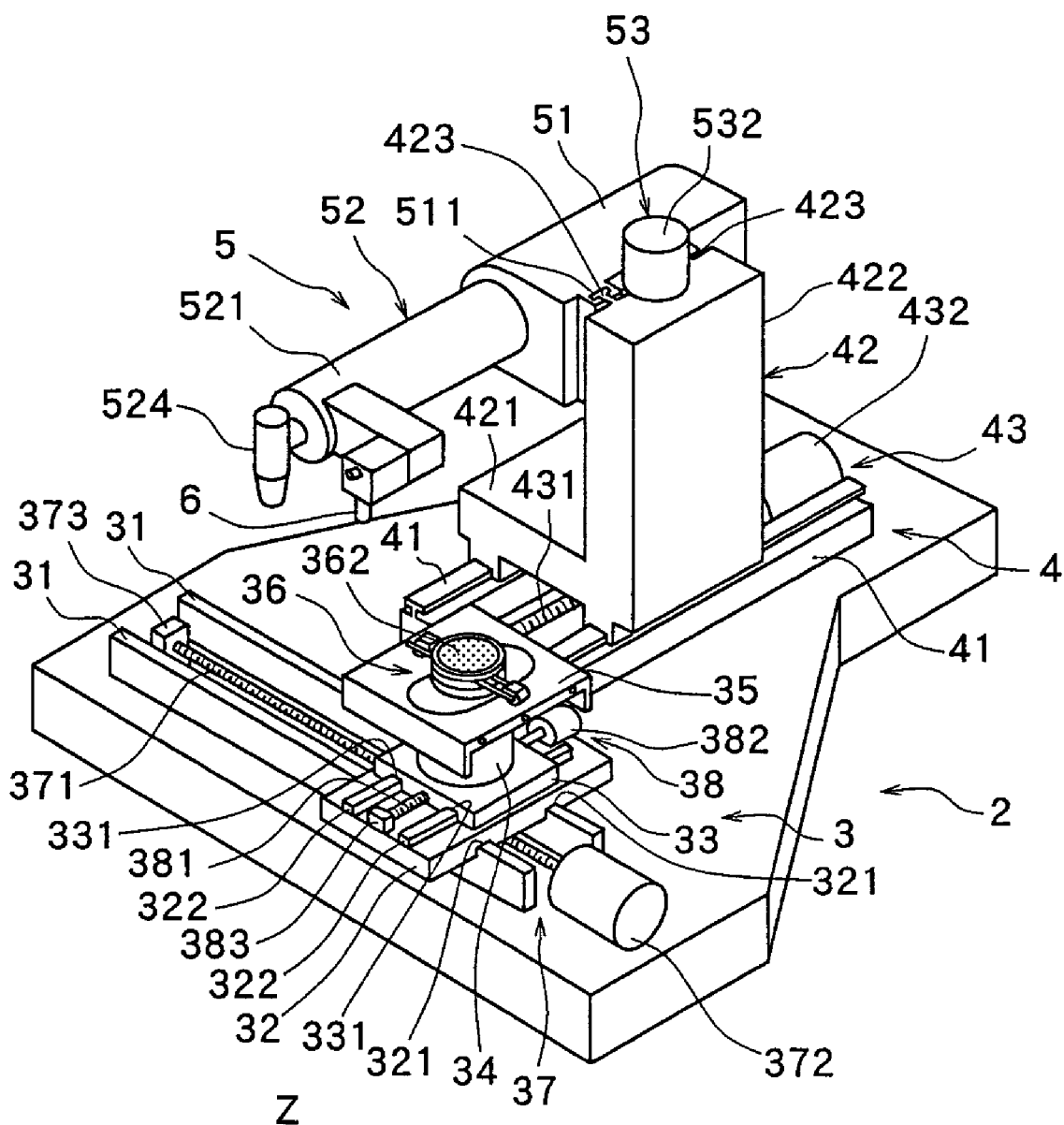
FIG. 1 is a perspective view of a laser beam processing machine constituted according to the present invention.
Figure 1:
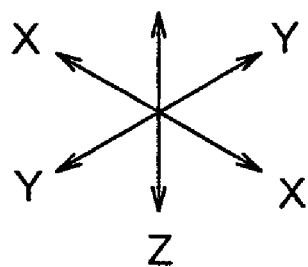

FIG. 1 is a perspective view of a laser beam processing machine constituted according to the present invention. The laser beam processing machine shown in FIG. 1 comprises a stationary base 2, a chuck table mechanism 3 for holding a workpiece, which is mounted on the stationary base 2 in such a manner that it can move in a processing-feed direction indicated by an arrow X, a laser beam application unit support mechanism 4 that is mounted on the stationary base 2 in such a manner that it can move in an indexing-feed direction indicated by an arrow Y perpendicular to the direction indicated by the arrow X, and a laser beam application unit 5 that is mounted on the laser beam application unit support mechanism 4 in such a manner that it can move in a direction indicated by an arrow Z.

The above chuck table mechanism 3 comprises a pair of guide rails 31 and 31 that are mounted on the stationary base 2 and arranged parallel to each other in the processing-feed direction indicated by the arrow X, a first sliding block 32 mounted on the guide rails 31 and 31 in such a manner that it can move in the processing-feed direction indicated by the arrow X, a second sliding block 33 mounted on the first sliding block 32 in such a manner that it can move in the indexing-feed direction indicated by the arrow Y, a support table 35 supported on the second sliding block 33 by a cylindrical member 34, and a chuck table 36 as a workpiece holding means. This chuck table 36 will be described with reference to FIG. 2 and FIG. 3.

Figure 2:
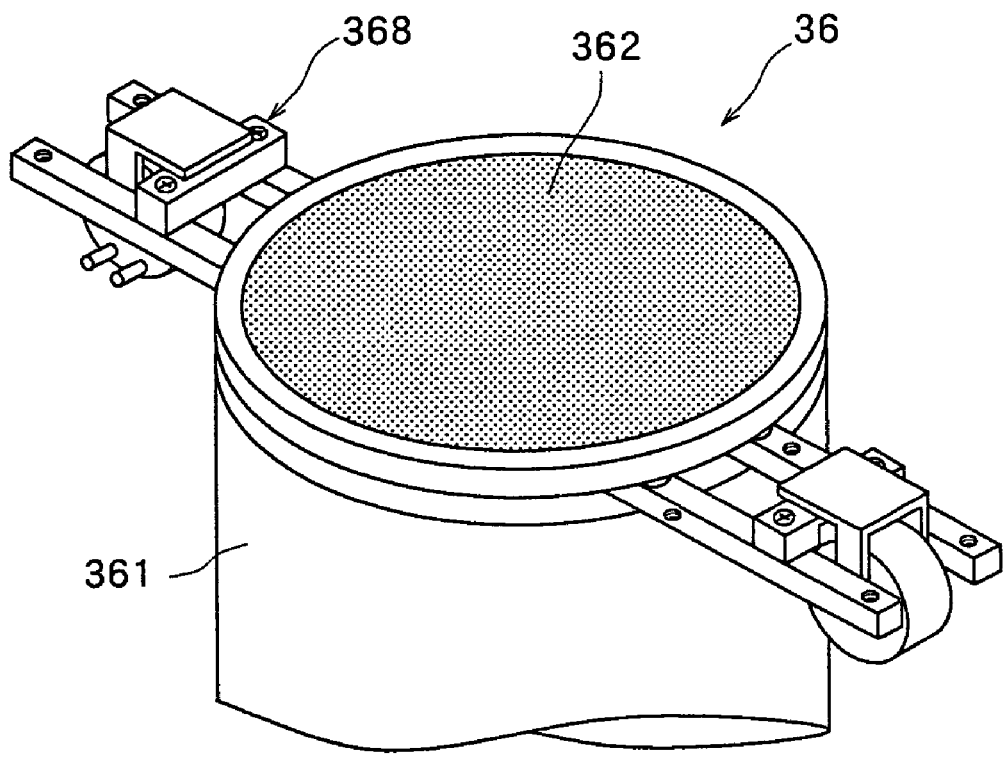
FIG. 2 is a perspective view of the principal portion of a chuck table provided in the laser beam processing machine shown in FIG. 1.
Figure 3:
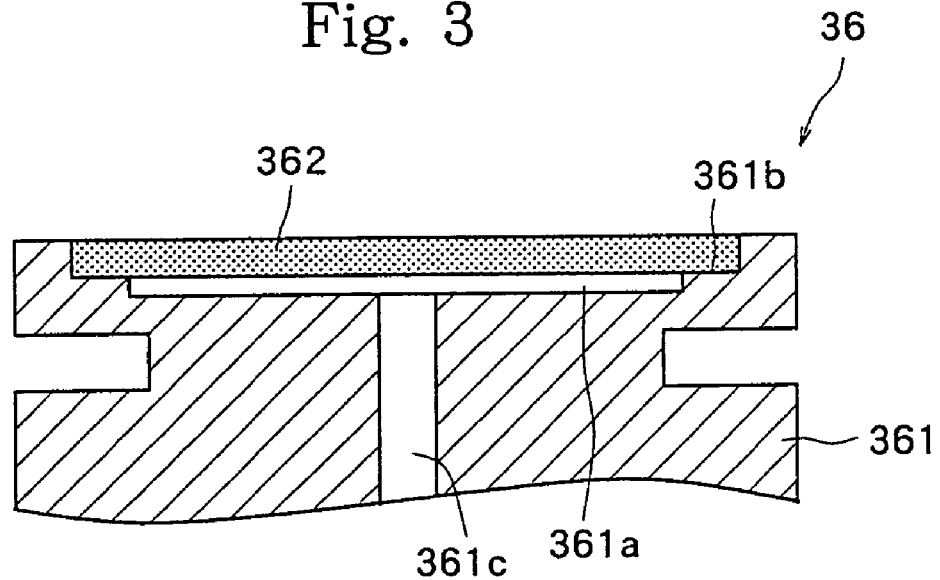
FIG. 3 is a sectional view of the chuck table shown in FIG. 2.

This chuck table 36 shown in FIG. 2 and FIG. 3 comprises a columnar body 361 and a workpiece holding member 362 having gas permeability, which is mounted on the top surface of the body 361. The body 361 is made of a metal such as stainless steel or the like and a circular fitting recess portion 361a is formed in the top surface. The fitting recess portion 361a has an annular placing shelf 361b for placing the workpiece holding member 362 in the peripheral portion of the bottom surface. A suction-path 361c open to the fitting recess portion 361a is formed in the body 361 and communicated with a suction means that is not shown. Therefore, when the suction means (not shown) is activated, negative pressure acts on the fitting recess portion 361a through the suction-path 361c. Therefore, the fitting recess portion 361a functions as a suction-holding area.

The workpiece holding member 362 is formed like a disk and made of a material that transmits a laser beam having a predetermined wavelength. This workpiece holding member 362 is made of a foamed quarts glass porous material having a transmittance of 90% or more for a pulse laser beam having a wavelength of 200 to 1,300 nm, which is applied by a laser beam later described, and may be of a thickness of 1 to 10 mm, in the embodiment shown in FIG. 2 and FIG. 3. Synthetic foamed quartz glass (T-4040) manufactured and marketed by Toshiba Ceramics Co., Ltd., for example, may be used as this material. This workpiece holding member 362 is fitted into the fitting recess portion 361a which serves as a suction-holding area formed in the body 361 of the chuck table 36 as shown in FIG. 3.

A description will be subsequently given of another embodiment of the workpiece holding member 362 with reference to FIG. 4 and FIG. 5.

Figure 4:
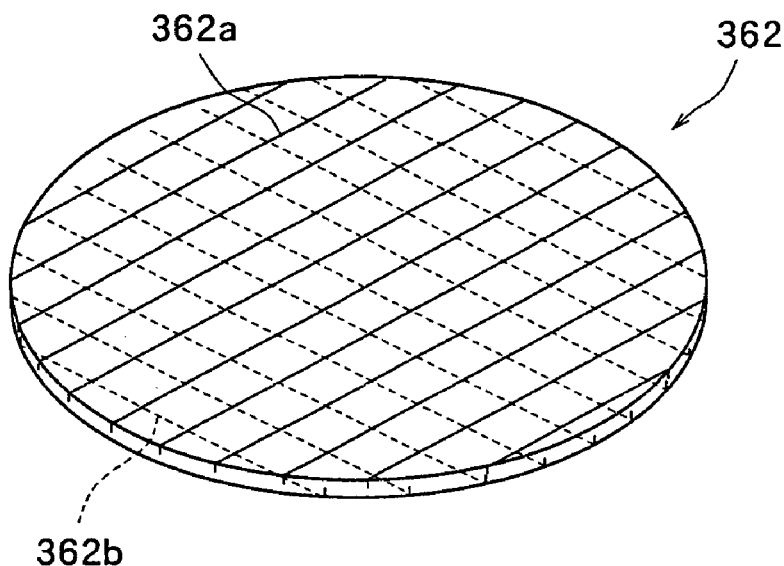
FIG. 4 is a perspective view of another embodiment of a holding member constituting the chuck table shown in FIG. 2.
Figure 5:
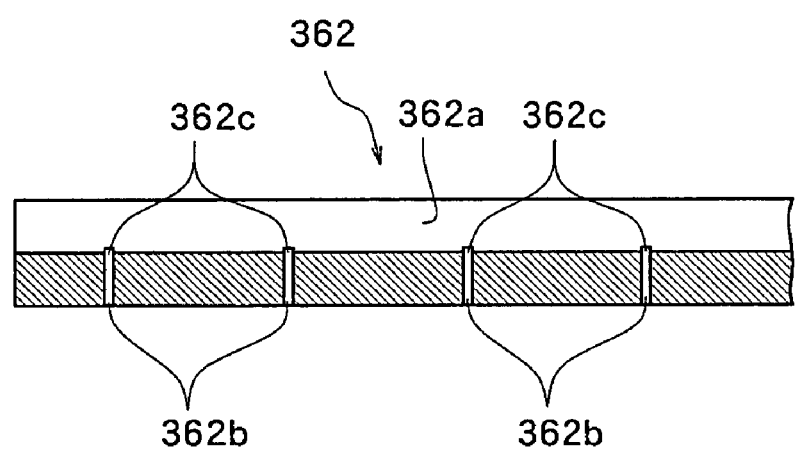
FIG. 5 is an enlarged sectional view of the holding member shown in FIG. 4.

The workpiece holding member 362 shown in FIG. 4 and FIG. 5 is a circular plate made of quartz glass having a transmittance of 90% or more for a pulse laser beam having a wavelength of 200 to 1,300 nm. This workpiece holding member 362 has a thickness of 1 to 10 mm, and a plurality of first grooves 362a having a depth which is about half of the thickness of the workpiece holding member 362 are formed parallel to each other in the top surface side in FIG. 4 and FIG. 5. Further, a plurality of second grooves 362b deep enough to reach the first grooves 362a are formed parallel to each other in a direction perpendicular to the direction of the first grooves 362a in the undersurface side in FIG. 4 and FIG. 5 of the workpiece holding member 362. The above first grooves 362a and the second grooves 362b have respectively a width of 20 μm and are formed at intervals of 3 mm in the illustrated embodiment. Therefore, a 20 μm square through-hole (suction hole) 362c is formed in portions where the first grooves 362a and the second grooves 362b cross each other. Consequently, the top surface and the undersurface of the workpiece holding member 362 communicate with each other through the through-holes (suction holes) 362c, first grooves 362a and second grooves 362b. It is desired that at least one of the top surface and undersurface of the thus constituted workpiece holding member 362 should be ground with a grindstone or sandblasted to be roughened. The thus formed workpiece holding member 362 is fitted into the fitting recess portion 361a which functions as a suction-holding area formed in the body 361 of the above chuck table 36.

The above workpiece holding member 362 may be placed on the top surface of a conventional suction-holding type chuck table. In this case, this conventional suction-holding type chuck table becomes the body of the chuck table in the present invention. Further, as the material for forming the above workpiece holding member, which transmits a laser beam having a predetermined wavelength, there may be used borosilicate glass or acrylic resin besides quartz glass.

Returning to FIG. 2, the chuck table 36 in the illustrated embodiment is provided with clamp mechanisms 368 for fixing a dicing frame on which a dicing tape put on the semiconductor wafer that is the workpiece and will be described later, is mounted. The chuck table 36 constituted as described above is so designed as to be rotated by a pulse motor (not shown) installed in the cylindrical member 34.

Returning to FIG. 1, the above first sliding block 32 has, on its undersurface, a pair of to-be-guided grooves 321 and 321 to be fitted to the above pair of guide rails 31 and 31 and, on its top surface, a pair of guide rails 322 and 322, which are formed parallel to each other in the indexing-feed direction indicated by the arrow Y. The first sliding block 32 constituted as described above is constituted so as to move in the processing-feed direction indicated by the arrow X along the pair of guide rails 31 and 31 by fitting the to-be-guided grooves 321 and 321 into the pair of guide rails 31 and 31, respectively. The chuck table mechanism 3 in the illustrated embodiment has a processing-feed means 37 for moving the first sliding block 32 along the pair of guide rails 31 and 31 in the processing-feed direction indicated by the arrow X. The processing-feed means 37 comprises a male screw rod 371 that is arranged between the above pair of guide rails 31 and 31 parallel thereto and a drive source such as a pulse motor 372 for rotary-driving the male screw rod 371. The male screw rod 371 is, at its one end, rotatably supported to a bearing block 373 fixed on the above stationary base 2 and is, at the other end, transmission-coupled to the output shaft of the above pulse motor 372. The male screw rod 371 is screwed into a threaded through-hole formed in a female screw block (not shown) projecting from the undersurface of the center portion of the first sliding block 32. Therefore, by driving the male screw rod 371 in a normal direction or reverse direction with the pulse motor 372, the first sliding block 32 is moved along the guide rails 31 and 31 in the processing-feed direction indicated by the arrow X.

The above second sliding block 33 has, on its undersurface, a pair of to-be-guided grooves 331 and 331 to be fitted into the pair of guide rails 322 and 322 formed on the top surface of the above first sliding block 32 and is constituted so as to move in the indexing-feed direction indicated by the arrow Y by fitting the guide grooves 331 and 331 into the pair of guide rails 322 and 322, respectively. The chuck table mechanism 3 in the illustrated embodiment has a first indexing-feed means 38 for moving the second sliding block 33 in the indexing-feed direction indicated by the arrow Y along the pair of guide rails 322 and 322 formed on the first sliding block 32. The first indexing-feed means 38 comprises a male screw rod 381 that is arranged between the above pair of guide rails 322 and 322 parallel thereto and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in a female screw block (not shown) projecting from the undersurface of the center portion of the second sliding block 33. Therefore, by driving the male screw rod 381 in a normal direction or reverse direction with the pulse motor 382, the second sliding block 33 is moved along the guide rails 322 and 322 in the indexing-feed direction indicated by the arrow Y.

The above laser beam application unit support mechanism 4 comprises a pair of guide rails 41 and 41 that are mounted on the stationary base 2 and arranged parallel to each other in the indexing-feed direction indicated by the arrow Y and a movable support base 42 mounted on the guide rails 41 and 41 in such a manner that it can move in the direction indicated by the arrow Y. This movable support base 42 is composed of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction indicated by the arrow Z on one of its flanks. The laser beam application unit support mechanism 4 in the illustrated embodiment comprises a second indexing-feed means 43 for moving the movable support base 42 along the pair of guide rails 41 and 41 in the indexing-feed direction indicated by the arrow Y. This second indexing means 43 comprises a male screw rod 431 that is arranged between the above pair of guide rails 41 and 41 parallel thereto and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Accordingly, by driving the male screw rod 431 in a normal direction or reverse direction with the pulse motor 432, the movable support base 42 is moved along the guide rails 41 and 41 in the indexing-feed direction indicated by the arrow Y.

The laser beam application unit 5 in the illustrated embodiment has a unit holder 51 and a laser beam application means 52 secured to the unit holder 51. The unit holder 51 is provided with a pair of to-be-guided grooves 511 and 511 to be slidably fitted to the pair of guide rails 423 and 423 formed on the above mounting portion 422, and is supported in such a manner that it can move in the direction indicated by the arrow Z by fitting the to-be-guided grooves 511 and 511 to the above guide rails 423 and 423, respectively.

Figure 6:
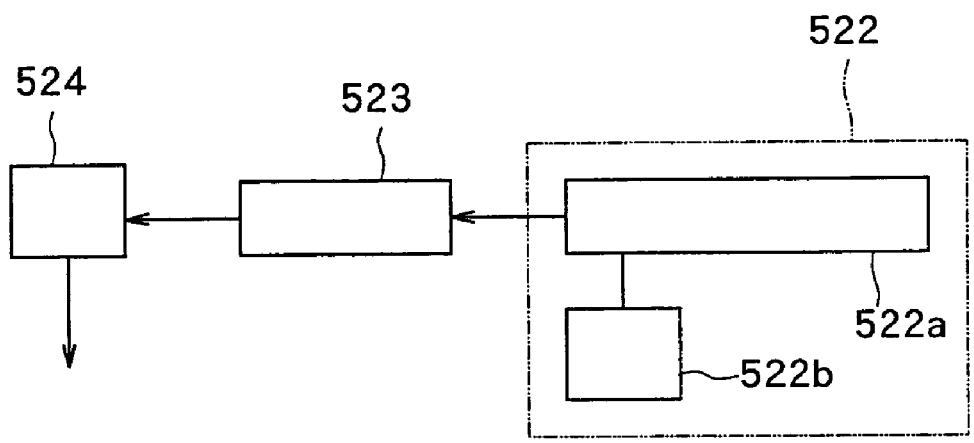
FIG. 6 is a block diagram schematically showing the constitution of a laser beam application means provided in the laser beam processing machine shown in FIG. 1.

The illustrated laser beam application means 52 comprises a cylindrical casing 521 that is secured to the above unit holder 51 and extends substantially horizontally. In the casing 521, there are an installed a pulse laser beam oscillation means 522 and a transmission optical system 523, as shown in FIG. 6. The pulse laser beam oscillation means 522 is constituted by a pulse laser beam oscillator 522a composed of a YAG laser oscillator or YVO4 laser oscillator and a repetition frequency setting means 522b connected to the pulse laser beam oscillator 522a. The pulse laser beam oscillation means 522 constituted as described above oscillates a pulse laser beam having a wavelength of 200 to 1,300 nm. That is, as a laser beam having a wavelength of 213 to 1,064 nm is used to process a silicon wafer, gallium arsenide wafer, alumina ceramic wafer, etc., the above pulse laser beam oscillation means 522 is designed to oscillate a pulse laser beam having a wavelength of 200 to 1,300 nm. The above transmission optical system 523 comprises suitable optical elements such as a beam splitter, etc. A condenser 524 housing a condensing lens (not shown) constituted by a set of lenses which may be known formation per se, is attached to the end of the above casing 521.

Figure 7:
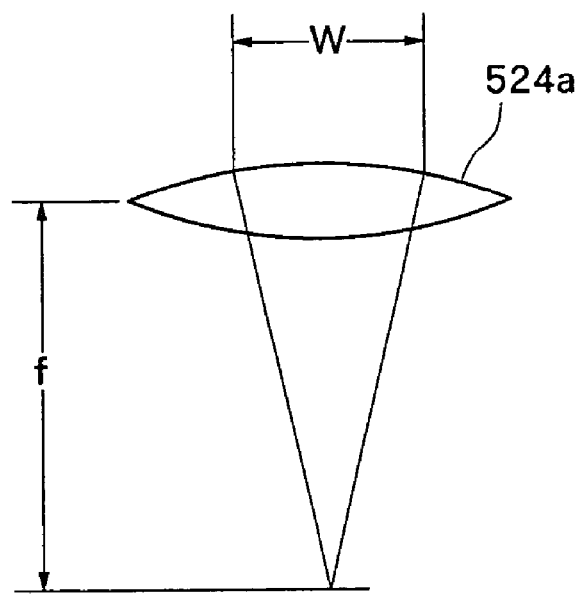
FIG. 7 is a schematic diagram explaining the focusing spot diameter of a laser beam applied from the laser beam application means shown in FIG. 6.

A laser beam oscillated from the above pulse laser beam oscillation means 522 reaches the condenser 524 through the transmission optical system 523 and is applied from the condenser 524 to the workpiece held on the above chuck table 36 at a predetermined focusing spot diameter D. This focusing spot diameter D is defined by the expression $D\ (\mu m) = 4 \times \lambda \times f / (\pi \times W)$ (wherein $\lambda$ is the wavelength ($\mu m$) of the pulse laser beam, W is the diameter (mm) of the pulse laser beam applied to an objective condenser lens 524a, and f is the focusing distance (mm) of the objective condenser lens 524a) when the pulse laser beam showing a Gaussian distribution is applied through the objective condenser lens 524a of the condenser 524, as shown in FIG. 7.

Returning to FIG. 1, an image pick-up means 6 for detecting the area to be processed by the above laser beam application means 52 is attached to the front end of the casing 521 constituting the above laser beam application means 52. This image pick-up means 6 comprises an illuminating means for illuminating the workpiece, an optical system for capturing the area illuminated by the illuminating means, and an image pick-up device (CCD) for picking up an image captured by the optical system. An image signal is supplied to a control means that is not shown.

The laser beam application unit 5 in the illustrated embodiment has a moving means 53 for moving the unit holder 51 along the pair of guide rails 423 and 423 in the direction indicated by the arrow Z. The moving means 53 comprises a male screw rod (not shown) arranged between the pair of guide rails 423 and 423 and a drive source such as a pulse motor 532 for rotary-driving the male screw rod. By driving the male screw rod (not shown) in a normal direction or reverse direction with the pulse motor 532, the unit holder 51 and the laser beam application means 52 are moved along the guide rails 423 and 423 in the direction indicated by the arrow Z. In the illustrated embodiment, the laser beam application means 52 is moved up by driving the pulse motor 532 in a normal direction and moved down by driving the pulse motor 532 in the reverse direction.

A description will be subsequently given of the procedure of laser-processing the workpiece by using the above laser beam processing machine.

Figure 8:
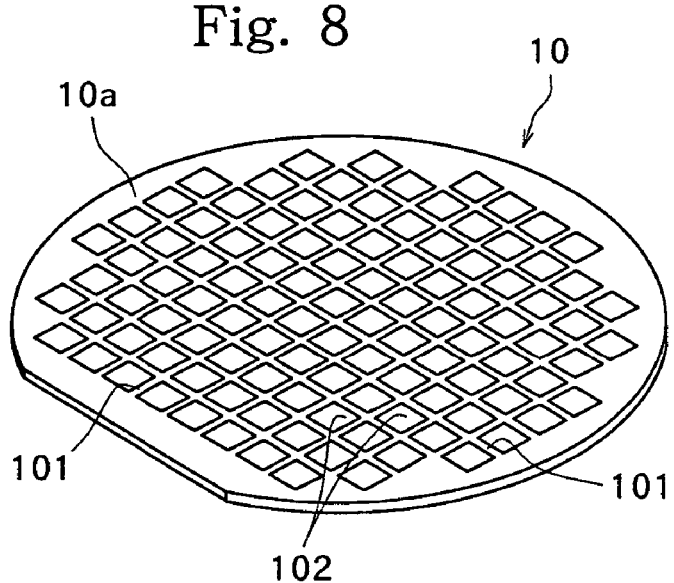
FIG. 8 is a perspective view of a semiconductor wafer as a workpiece.

FIG. 8 is a perspective view of the semiconductor wafer as the workpiece to be laser processed. The semiconductor wafer 10 shown in FIG. 8 is made of a silicon wafer, a plurality of areas are sectioned by a plurality of dividing lines 101 formed in a lattice pattern on the front surface 10a, and a circuit 102 such as IC or LSI is formed in each of the sectioned areas.

Figure 9:
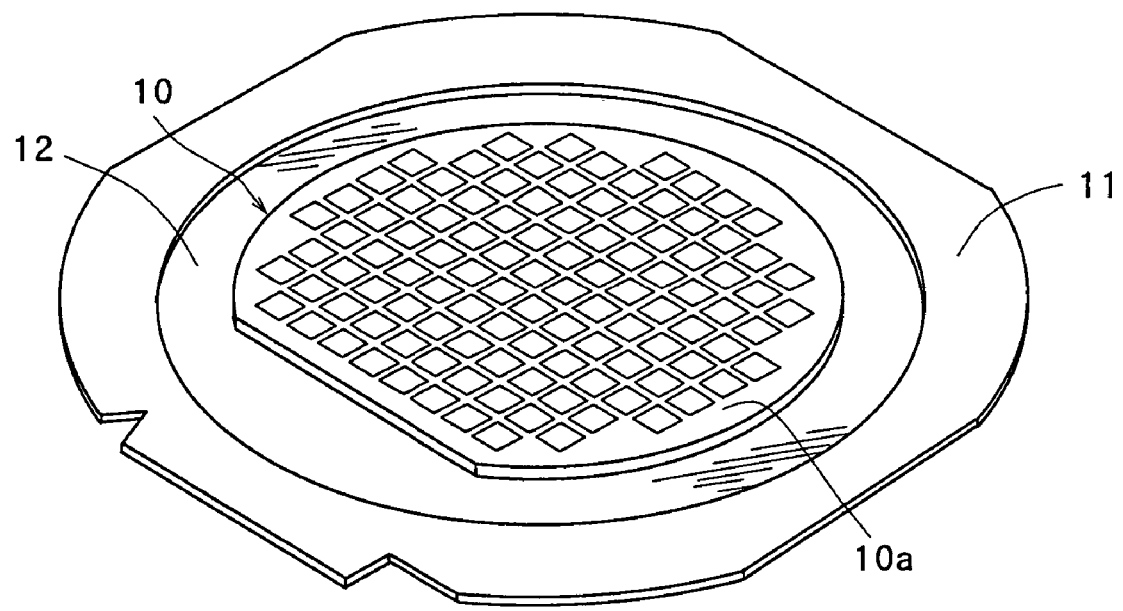
FIG. 9 is a perspective view showing a state where the semiconductor wafer shown in FIG. 8 is put on a dicing tape mounted on an annular dicing frame.

The semiconductor wafer 10 constituted as described above is put on the dicing tape 12 which is a synthetic resin sheet made of a polyolefin etc. and mounted on the annular dicing frame 11 in such a manner that the front surface 10a faces up, as shown in FIG. 9.

The semiconductor wafer 10 supported to the dicing frame 11 through the dicing tape 12 is conveyed onto the workpiece holding member 362 of the chuck table 36 constituting the chuck table mechanism 3 of the laser beam processing machine shown in FIG. 1 in such a manner that the front surface 10a faces up, and placed on the workpiece holding member 362 through the dicing tape 12. When the suction means (not shown) is activated, negative pressure acts on the fitting recess portion 361a through the suction-path 361c formed in the body 361 of the chuck table 36, as shown in FIG. 3. In the embodiment shown in FIG. 3, as the workpiece holding member 362 fitted into the fitting recess portion 361a is made of a foamed quartz glass porous material and has innumerable pores, negative pressure applied to the fitting recess portion 361a acts on the top surface of the workpiece holding member 362. As a result, the semiconductor wafer 10 placed on the workpiece holding member 362 through the dicing tape 12 is suction-held on the workpiece holding member 362. Further, the dicing frame 11 on which the dicing tape 12 is mounted, is fixed by the clamp mechanisms 368 provided on the chuck table 36. The chuck table 36 thus suction-holding the semiconductor wafer 10 is moved along the guide rails 31 and 31 by activation of the processing-feed means 37 and is brought to a position right below the image pick-up means 6 mounted on the laser beam application unit 5.

After the chuck table 51 is positioned right below the image pick-up means 6, alignment work for detecting the area to be processed of the semiconductor wafer 2 is carried out by the image pick-up means 6 and the control means that is not shown. That is, the image pick-up means 6 and the control means (not shown) carry out image processing such as pattern matching, etc. to align a dividing line 101 formed in a predetermined direction of the semiconductor wafer 10 with the condenser 524 of the laser beam application unit 5 for applying a laser beam along the dividing line 101, thereby performing the alignment of a laser beam application position. The alignment of the laser beam application position is also similarly carried out on dividing lines 101 formed on the semiconductor wafer 10 in a direction perpendicular to the predetermined direction.

After the dividing line 101 formed on the semiconductor wafer 10 held on the chuck table 36 is detected and the alignment of the laser beam application position is carried out as described above, the chuck table 36 is moved to a laser beam application area where the condenser 524 for applying a laser beam is located to bring the predetermined dividing line 101 to a position right below the condenser 524, as shown in FIG. 10(a). At this point, as shown in FIG. 10(a), the semiconductor wafer 10 is positioned such that one end (left end in FIG. 10(a)) of the dividing line 101 is located right below the condenser 524. The chuck table 36 is then moved in the processing-direction indicated by the arrow X1 at a predetermined processing-feed rate while a pulse laser beam is applied from the condenser 524 of the laser beam application means 52. At this point, the focusing point P of the laser beam applied from the condenser 524 is set to the front surface 10a of the semiconductor wafer 10. Then, when the other end (right end in FIG. 10(b)) of the dividing line 101 reaches a position right below the condenser 524 as shown in FIG. 10(b), the application of the pulse laser beam is suspended. As a result, as shown in FIG. 11, in the semiconductor wafer 10, a groove 110 reaching the dicing tape 12 is formed along the dividing line 101 (laser beam application step).

The processing conditions in the above laser beam application step are set as follows in the illustrated embodiment.

Light source: YAG laser or YVO4 laser
Wavelength: 355 nm

Output: 4 to 5 W
Repetition frequency: 30 kHz
Pulse width: 100 ns
Processing-feed rate: 50 to 400 mm/sec In the above-mentioned laser beam application step, the laser beam by which the groove 110 has been formed passes through the dicing tape 12 and reaches the workpiece holding member 362 of the chuck table 36. However, as the workpiece holding member 362 is made of a foamed quartz glass porous material having a transmittance of 90% or more for a pulse laser beam having a wavelength of 200 to 1,300 nm applied by the laser beam application means 52 as described above, the laser beam is not absorbed by the surface of the workpiece holding member 362. Consequently, the generation of heat from the workpiece holding member 362 is suppressed and hence, the dicing tape 12 is not molten. Accordingly, this eliminates problems that the molten dicing tape 12 adheres to the workpiece holding member 362 to contaminate the chuck table and that the wafer cannot be carried out from the chuck table. The laser beam passing through the workpiece holding member 362 is scattered effectively because the workpiece holding member 362 is made of a foamed quartz glass porous material. Further, even if the laser beam overruns the semiconductor wafer 10 as the workpiece and is applied to the dicing tape 12 directly in the above laser beam application step, the laser beam passing through the dicing tape 12 and reaching the workpiece holding member 362 is not absorbed by the workpiece holding member 362, whereby the generation of heat from the holding member 362 is suppressed and the dicing tape 12 is not molten.

Even when the workpiece holding member 362 of the chuck table 36 is composed of a quartz glass plate shown in FIG. 4 and FIG. 5, the same function and effect as those of the workpiece holding member 362 of the chuck table 36 shown in FIG. 2 and FIG. 3 are obtained. That is, although a laser beam by which the groove 110 has been formed in the above laser beam application step, passes through the dicing tape 12 and reaches the workpiece holding member 362 which is a quartz glass plate shown in FIG. 4 and FIG. 5 of the chuck table 36, the laser beam is not absorbed by the surface of the workpiece holding member 362 because the workpiece holding member 362 is made of quartz glass having a transmittance of 90% or more for a pulse laser beam having a wavelength of 200 to 1,300 nm. Therefore, the generation of heat from the workpiece holding member 362 is suppressed and the dicing tape 12 is not molten. When the top surface or undersurface of the workpiece holding member 362 made of quartz glass is roughened, the laser beam passing through the workpiece holding member 362 is scattered effectively.

After the laser beam application step is carried out along the predetermined dividing line 101 of the semiconductor wafer 10 as described above, the chuck table 36, therefore, the semiconductor wafer 10 is indexing-fed by a distance corresponding to the interval between dividing lines 101, in the direction perpendicular to the dividing line 101 to carry out the above laser beam application step on the next adjacent dividing line 101. By carrying out this indexing-feed step and the laser beam application step repeatedly, the grooves 110 can be formed along all the dividing lines 101 extending in the predetermined direction of the semiconductor wafer 10. After the laser beam application step is carried out on all the dividing lines 101 extending in the predetermined direction of the semiconductor wafer 10 as described above, the chuck table 36, that is, the semiconductor wafer 10 is turned at 90° to carry out the laser beam application step on dividing lines 101 extending in a direction perpendicular to the above predetermined direction. As a result, the grooves 110 are formed along all the dividing lines 101 of the semiconductor wafer 10, thereby dividing the semiconductor wafer 10 into individual chips. Since the chips thus obtained are put on the dicing tape 12, they do not fall apart and the form of the wafer is maintained.

A description will be subsequently given of another embodiment of the chuck table constituted according to the present invention with reference to FIG. 12 and FIG. 13.

Figure 12:
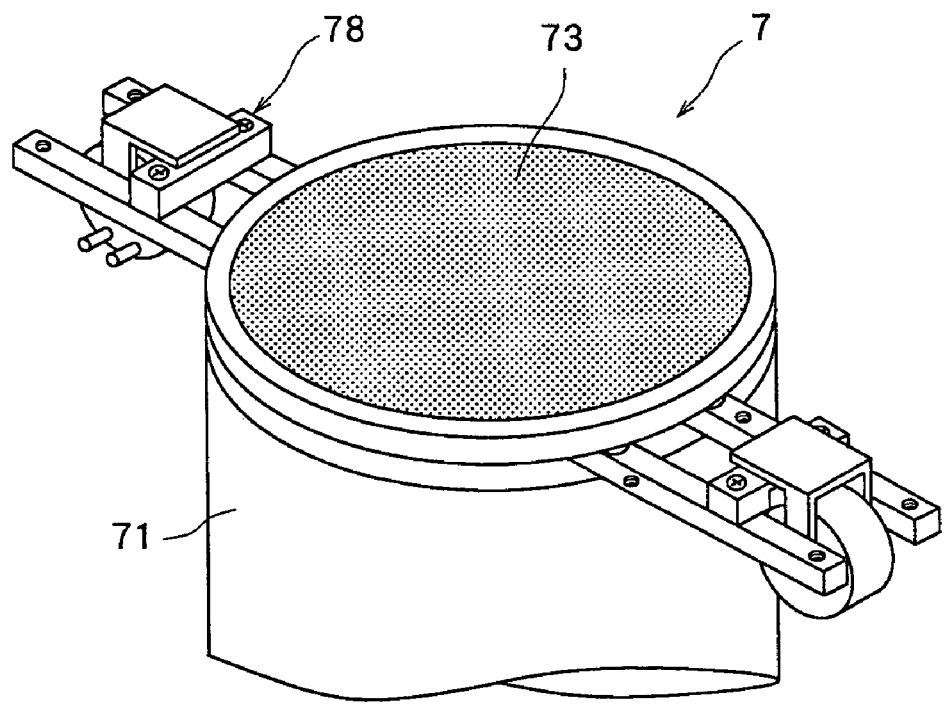
FIG. 12 is a perspective view of the principal portion of another embodiment of the chuck table provided in the laser beam processing machine shown in FIG. 1.
Figure 13:
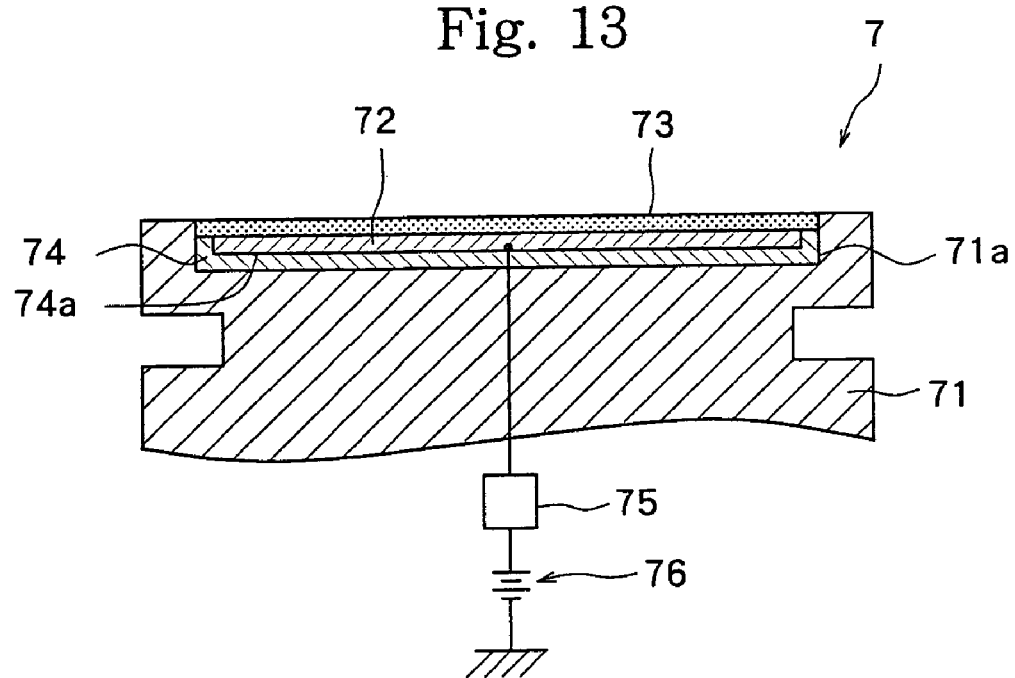
FIG. 13 is a sectional view of the chuck table shown in FIG. 12.

The chuck table 7 shown in FIG. 12 and FIG. 13 is constituted by an electrostatic chuck, and the electrostatic chuck comprises a columnar electrostatic chuck body 71, an electrode 72 mounted on the top surface of the electrostatic chuck body 71 and a workpiece holding member 73 laminated on the electrode 72. The body 71 is made of a metal material such as stainless steel, etc. and a circular fitting recess portion 71a is formed in the top surface, as shown in FIG. 13.

The electrode 72 is mounted on the top surface of an insulating support substrate 74 that is fitted into a fitting recess portion 71a formed in the top surface of the above electrostatic chuck body 71. The insulating support substrate 74 is made of an insulating material such as alumina etc., a fitting recess portion 74a is disposed on the top surface of the insulating support substrate 74, and the electrode 72 is fitted into this fitting recess portion 74a. The electrode 72 thus mounted on the top surface of the insulating support substrate 74 is connected to the positive (+) pole of a DC power source 76 through a power control circuit 75.

The workpiece holding member 73 is formed like a disk and made of a material that transmits a laser beam having a predetermined wavelength. In the embodiment shown in FIG. 12 and FIG. 13, this workpiece holding member 73 is made of a foamed quartz glass porous material having a transmittance of 90% or more for a pulse laser beam having a wavelength of 200 to 1,300 nm, which will be described later, and its thickness may be 0.1 to 1 mm. Synthetic foamed quartz glass (T-4040) manufactured and marketed by Toshiba Ceramics Co., Ltd. may be used as this material. The workpiece holding member 73 thus formed is laminated on the electrode 72 of the chuck table 7, as shown in FIG. 13.

A description will be subsequently given of still another embodiment of the workpiece holding member 73 with reference to FIG. 14.

Figure 14:
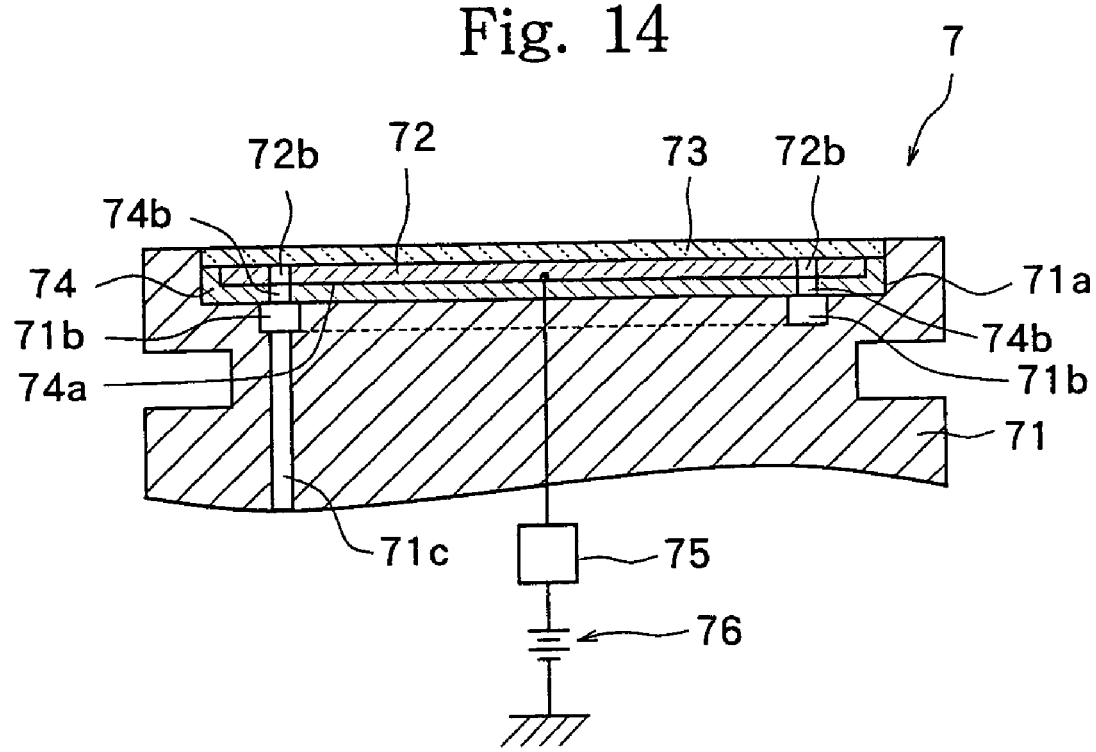
FIG. 14 is a sectional view of still another embodiment of the chuck table provided in the laser beam processing machine shown in FIG. 1.

The workpiece holding member 73 shown in FIG. 14 is formed like a disk and made of a plate of quartz glass having a transmittance of 90% or more for a pulse laser beam having a wavelength of 200 to 1,300 mm, which has a thickness of 0.1 to 1 mm. It is desired that at least one of the top surface and undersurface of this workpiece holding member 73 should be ground with a grindstone or sandblasted to be roughened. As the material for forming the workpiece holding member 73, which transmits a laser beam having a predetermined wavelength, there can be used borosilicate glass or acrylic resin besides quartz glass. The workpiece holding member 73 thus formed is disposed as a laminate on the electrode 72 of the chuck table 7. In the embodiment shown in FIG. 14, an annular suction-path 71b open to the bottom of the fitting recess portion 71a and a communication path 71c communicating with the annular suction-path 71b and a suction means (not shown) are formed in the electrostatic chuck body 71. A plurality of suction-holes 74b communicating with the annular suction-path 71b are formed in the insulating support substrate 74 fitted into the fitting recess portion 71a, and a plurality of suction-holes 72b communicating with the plurality of respective suction-holes 74b formed in the insulating support substrate 74 are formed in the electrode 72. Therefore, in the embodiment shown in FIG. 14, when the suction means (not shown) is activated, negative pressure acts on the undersurface of the workpiece holding member 73 through the above communication path 71*c*, annular suction-path 71*b*, plurality of suction-holes 74*b* and plurality of suction-holes 72*b* to suction-hold the workpiece holding member 73 on the electrode 72. Therefore, by canceling the suction-holding of the workpiece holding member 73, the workpiece holding member 73 can be easily removed from the electrostatic chuck body 71 and exchanged when it is worn out.

The chuck table 7 shown in FIGS. 12 to 14 is constituted as described above, and the semiconductor wafer 10 supported to the above dicing frame 11 through the dicing tape 12 is placed on the workpiece holding member 73 through the dicing tape 12. When voltage is then applied to the electrode 72 by activating the power control circuit 75, the workpiece holding member 73 laminated on the electrode 72 has positive electric charge. Meanwhile, when the dicing tape 12 is connected to the negative (−) pole of the DC power source 76, the dicing tape 12, that is, the semiconductor wafer 10 has negative electric charge. As a result, the dicing tape 12, that is, the semiconductor wafer 10 is electrostatically adsorbed and held on the workpiece holding member 73. The dicing frame 11 on which the dicing tape 12 has been mounted is fixed by the clamp mechanisms 78 provided on the chuck table 7.

Figure 10:
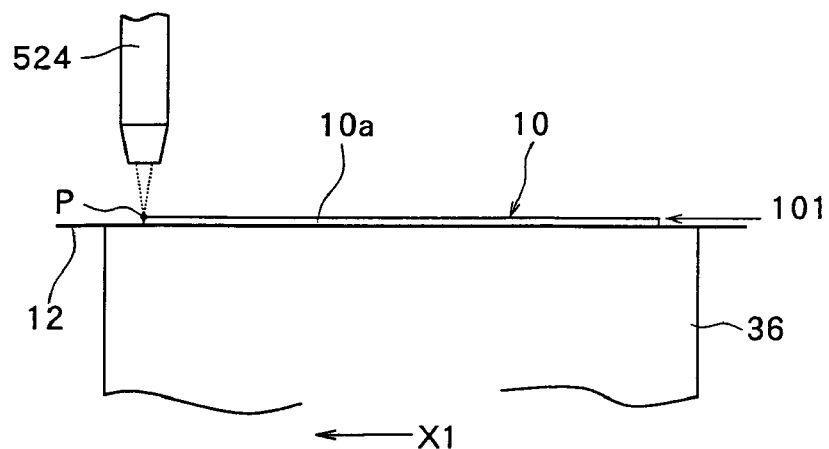
FIGS. 10(a) and 10(b) are explanatory diagrams of a laser beam application step, which is carried out by the laser beam processing machine shown in FIG. 1.
Figure 10:
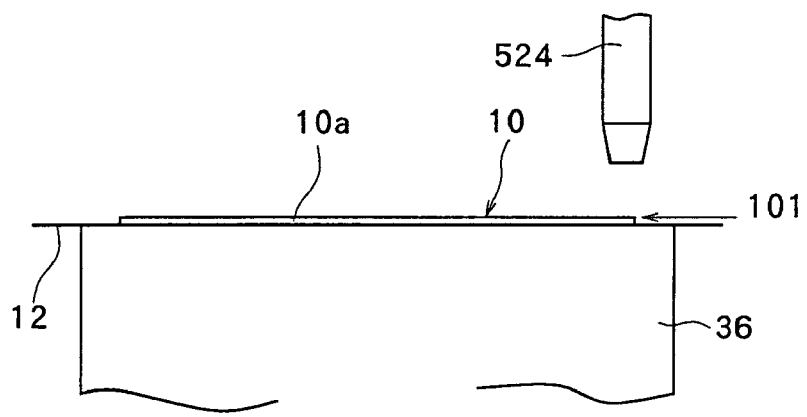
Figure 11:
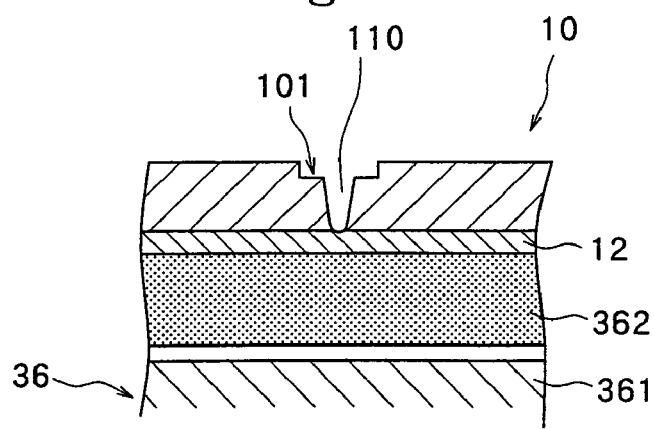
FIG. 11 is an enlarged sectional view of the semiconductor wafer subjected to the laser beam application step.
Figure 15:
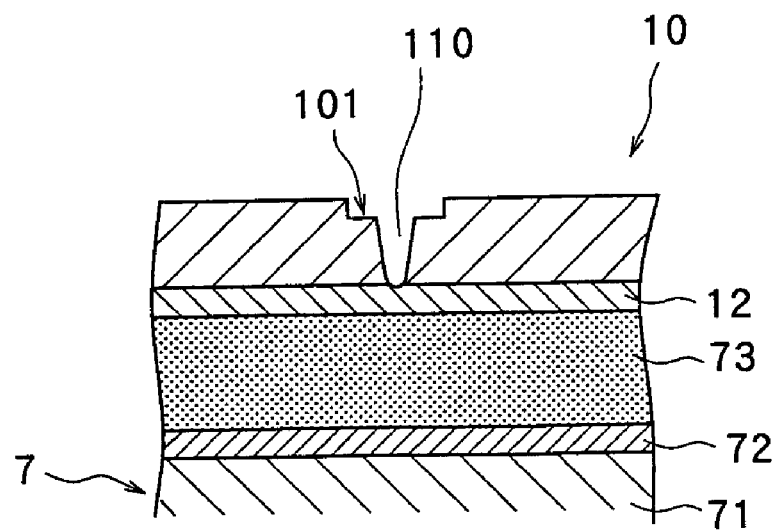
FIG. 15 is an enlarged sectional view of the semiconductor wafer subjected to the laser beam application step using the chuck table shown in FIGS. 12 to 14.

After the semiconductor wafer 10 is electrostatically adsorbed and held on the chuck table 7 as described above, the laser beam application step shown in FIGS. 10(*a*) and 10(*b*) is carried out to form a groove 110 that reaches the dicing tape 12, along the dividing lines 101 of the semiconductor wafer 10, as shown in FIG. 15.

In the above laser beam application step, a laser beam which had formed the groove 110 passes through the dicing tape 12 and reaches the workpiece holding member 73 of the chuck table 7. Since the workpiece holding member 73 in the embodiment shown in FIG. 12 and FIG. 13 is made of a foamed quartz glass porous material having a transmittance of 90% or more for a pulse laser beam having a wavelength of 200 to 1,300 nm applied by the laser beam application means 52 as described above, the pulse laser beam is not absorbed by the surface of the workpiece holding member 73. Therefore, the generation of heat from the workpiece holding member 73 is suppressed and hence, the dicing tape 12 is not molten. Consequently, this eliminates problems that the molten dicing tape 12 adheres to the workpiece holding member 73 to contaminate the chuck table and that the wafer cannot be carried out from the chuck table. The laser beam passing through the workpiece holding member 73 is scattered effectively as the workpiece holding member 73 is made of a foamed quartz glass porous material. Even if the laser beam overruns the semiconductor wafer 10 as the workpiece and is applied to the dicing tape 12 directly in the above laser beam application step, the laser beam passing through the dicing tape 12 and reaching the workpiece holding member 73 is not absorbed by the workpiece holding member 73, whereby the generation of heat from the holding member 73 is suppressed and hence, the dicing tape 12 is not molten.

Even when the workpiece holding member 73 of the chuck table 7 is composed of a quartz glass plate shown in FIG. 14, the same function and effect as those of the workpiece holding member 73 of the chuck table 7 shown in FIG. 12 and FIG. 13 are obtained. That is, even in the case of the workpiece holding member 73 composed of a quartz glass plate shown in FIG. 14, a laser beam by which the groove 110 has been formed in the above laser beam application step passes through the dicing tape 12 and reaches the workpiece holding member 73 of the chuck table 7. However, as the workpiece holding member 73 is made of quartz glass having a transmittance of 90% or more for a pulse laser beam having a wavelength of 200 to 1,300 nm, the pulse laser beam is not absorbed by the surface of the workpiece holding member 73. Consequently, the generation of heat from the workpiece holding member 73 is suppressed and the dicing tape 12 is not molten. When the top surface or undersurface of the workpiece holding member 73 made of quartz glass, borosilicate glass or acrylic resin is roughened, the laser beam passing through the workpiece holding member 72 is scattered effectively.

What is claimed is:

1. A method of processing a semiconductor wafer by a laser beam, comprising the steps of:

providing a chuck table having a body and a workpiece holding member disposed on a top surface of the body, said workpiece holding member being made of a quartz glass plate which transmits a laser beam having a wavelength of 200 to 1,300 nm:

placing on the workpiece holding member a semiconductor wafer having a dicing tape attached to a surface of the semiconductor wafer with the dicing tape disposed between the workpiece holding member and the semiconductor wafer so that the dicing tape adjoins the workpiece holding member;

applying a laser beam to the semiconductor wafer held on the chuck table while moving the chuck table and the laser beam application means relative to each other for a processing feed to dice the semiconductor wafer by the laser beam; and while dicing the semiconductor wafer by the laser beam, causing the laser beam to be transmitted through the workpiece holding member of the quartz glass plate, thereby suppressing heat generation in the workpiece holding member and preventing thermal melting of the dicing tape by generated heat in the workpiece holding member, wherein the quartz glass plate has suction holes communicating between opposite surfaces thereof, at least one of the opposite surfaces of the quartz glass plate is roughened, the quartz glass plate is a porous, foamed quartz glass plate having said suction holes for suction-holding the wafer through the dicing tape, and the quartz glass plate has a transmission of 90% or more for laser wavelengths of 200 to 1,300 nm, wherein the laser beam passes through the dicing tape.

* * * * *